US012753874B2

(12) United States Patent

Dos Santos et al.

(10) Patent No.: US 12,753,874 B2
(45) Date of Patent: Oct. 6, 2026

(54) METHOD AND TOOL FOR INSPECTING THE CONDITION OF THE INTERNAL SURFACE OF PIPES

(71) Applicants: PETRÓLEO BRASILEIRO S.A.—PETROBRAS, Rio de Janeiro (BR); UNIVERSIDADE FEDERAL DO RIO DE JANEIRO (UFRJ), Rio de Janeiro (BR)

(72) Inventors: Rafael Wagner Florencio Dos Santos, Rio de Janeiro (BR); Lucas Braga Campos, Rio de Janeiro (BR); Cesar Giron Camerini, Rio de Janeiro (BR); Gabriela Ribeiro Pereira, Rio de Janeiro (BR); Vitor Manoel De Araujo Silva, Rio de Janeiro (BR)

(73) Assignees: PETRÓLEO BRASILEIRO S.A.—PETROBRAS, Rio de Janeiro (BR); UNIVERSIDADE FEDERAL DO RIO DE JANEIRO (UFRJ), Rio de Janeiro (BR)

( * ) Notice: Subject to any disclaimer, the term of this patent is extended or adjusted under 35 U.S.C. 154(b) by 181 days.

(21) Appl. No.: 18/394,959

(22) Filed: Dec. 22, 2023

(65) Prior Publication Data

US 2024/0209975 A1 Jun. 27, 2024

(30) Foreign Application Priority Data

Dec. 22, 2022 (BR) ...................... 10 2022 026427 9

(51) Int. Cl.
*F16L 55/40* (2006.01)
*F16L 101/30* (2006.01)
(Continued)

(52) U.S. Cl.
CPC ............ *F16L 55/40* (2013.01); *G01N 27/902* (2013.01); *G01N 27/904* (2013.01); *F16L 2101/30* (2013.01)

(58) Field of Classification Search
None
See application file for complete search history.

(56) References Cited

U.S. PATENT DOCUMENTS 5,659,142 A * 8/1997 Lima ....................... F16L 55/28 73/865.8
2001/0017541 A1* 8/2001 Kwun ................ G01N 29/2412 324/240

(Continued)

FOREIGN PATENT DOCUMENTS

| | | | |
|---|---|---|---|
| BR | 102018001447 | A2 | 8/2019 |
| CN | 216955849 | U | 7/2022 |
| CN | 217278060 | U | 8/2022 |

OTHER PUBLICATIONS

Debnar Beinssen Angelika; Materials testing probe using eddy currents, e.g. for walls of metallic pipes; Publication Oct. 30, 1997; Debnar Beinssen Angelika Dipl; Publication DE19714685A1; CPC (EP) (Year: 1997).*

*Primary Examiner* — Nasima Monsur
(74) *Attorney, Agent, or Firm* — McCarter & English, LLP

(57) ABSTRACT

A tool for inspection of the condition of the internal surface of pipes having at least one Pipe Intervention Gadget ("PIG") structural body, a plurality of eddy current sensors, and a pressure vessel housing a set of electronics in a tight manner inside the same. An inspection method uses said inspection tool.

10 Claims, 19 Drawing Sheets

(51) Int. Cl.
*G01N 27/9013* (2021.01)
*G01N 27/904* (2021.01)

(56) References Cited

U.S. PATENT DOCUMENTS

| | | | | |
|---|---|---|---|---|
| 2007/0022830 | A1* | 2/2007 | Mandziuk | G01N 27/902<br>73/865.8 |
| 2011/0167914 | A1* | 7/2011 | Sutherland | F17D 1/00<br>73/643 |
| 2012/0291569 | A1 | 11/2012 | Hill et al. | |
| 2016/0274060 | A1 | 9/2016 | Denenberg et al. | |
| 2017/0191361 | A1 | 7/2017 | Khalaj Amineh et al. | |
| 2018/0172638 | A1* | 6/2018 | Banks | G01N 27/904 |
| 2019/0178844 | A1* | 6/2019 | Lott | G01R 33/028 |

* cited by examiner

METHOD AND TOOL FOR INSPECTING THE CONDITION OF THE INTERNAL SURFACE OF PIPES

RELATED APPLICATIONS

This application claims the benefit of Brazilian Patent Application No. BR 10 2022 026427 9, filed Dec. 22, 2022, the entire contents of which are explicitly incorporated by reference herein.

FIELD

The present invention relates to the technical field of pipe inspection technologies. More specifically, the use of instrumented PIGs (Pipe Intervention Gadgets) that allow the inspection and assessment of the pipe walls along their entire length.

BACKGROUND

Ensuring the integrity of fuel transport lines is a highly relevant activity for pipeline network operators. The pipes for transporting fuel range in length from hundreds to thousands of kilometers, with part of their length below the earth surface. Therefore, anomalies in such pipes generate major impacts on production, revenue losses due to maintenance stops, loss of product, and risks of accidents to the population, since such fuels are highly flammable and present risks of explosion, in addition to being harmful to the environment, which can cause contamination, which in turn generates more financial losses due to fines from responsible bodies.

Accordingly, an effective way to investigate the integrity of such assets is the use of instrumented PIGs that allow the inspection and assessment of the pipe walls along their entire length. However, in the case of land pipes, some failures have the characteristic of being unpredictable; that is, they can occur at any time without any prior signal (for example, in the case of the installation of clandestine derivations in pipes for product theft). This means that these lines require inspections on a more recurring basis, with a shorter interval between inspections, which becomes unfeasible with the use of conventional instrumented PIGs due to their high operating costs.

Furthermore, traditionally used instrumented PIGs, such as those that use conventional ultrasound techniques and electromagnetic techniques such as MFL (Magnetic Flux Leakage), require a large number of sensors to cover the entire internal surface of the pipes. Added to this, the PIGs that use the MFL technique have another difficulty because, due to the presence of magnets responsible for generating the magnetic field, they may need extra equipment to remove the tool from the line.

Another important point is that traditional inspection PIGs generally have a metallic body and, to avoid them getting stuck in the line, it is necessary to pass cleaning PIGs in order to remove scale or, through damage to the body of the cleaning PIGs, check the presence of deformations in the line. The sum of these factors means that both the manufacture and operation of such tools have high costs, and this makes it more complex to carry out more recurring inspections, with shorter intervals between such operations.

Due to the limitations of traditional methodologies, some tools using foam PIGs as a body for the sensors have been developed. However, deficiencies in these tools persist in the State of the Art.

Therefore, it is an objective of the present patent application to provide an improved Tool for Inspection of the condition of the internal surface of pipes that overcomes at least some of the disadvantages associated with the State of the Art.

STATE OF THE ART

In the State of the Art, there is the disclosure of some documents that teach about different tools for pipe inspection.

Document BR102018001447 refers to a tool formed by a cleaning PIG that, in addition to having this function, consists of sensors for measuring the force of removing deposits present in the lines. The tool can be used, for example, to assess the force required for the cleaning PIG to remove paraffin from the pipes and, with its results, obtain information about the scales and their level of severity.

Document U.S. Pat. No. 5,659,142A refers to a foam PIG tool that is provided with a pressure sensor (and may also have speed and temperature sensors), with the aim of accurately assessing the location and extent of obstructed regions or with interference in pipes.

Document US20120291569A1, similarly to the previous document, refers to a PIG that also aims at assessing the presence of deformations in pipes. The apparatus is configured to measure at least one parameter from which the extent of deflection of the outer surface of the foam body can be derived.

Document US20160274060A1 refers to a system and a method for characterizing the condition of the material. The system includes a sensor, impedance instrument, and processing unit to collect measurements and assess material properties. A cylindrical model for an electromagnetic field sensor is disclosed for modeling symmetric substantially cylindrical material systems.

Document CN217278060U refers to an eddy current sensor and detection system. The detection system adopts an eddy current detection method and an ultrasonic reflection method to realize full area scanning on the metal tube, and performs effective data analysis on the scanning signals, to finally obtain a high measurement result. accuracy of reducing the wall thickness of a marine copper tube.

Document US20170191361A1 refers to a method, which comprises a pipe inspection tool including one or more sensors, which will be transported to a wellbore with at least one pipe. A map of the pipe is then generated based on the measured responses and is divided into intervals that extend along the length of the pipe, and each interval corresponds to a percentage of metal loss in the pipe.

Finally, document CN216955849U refers to an eddy current detection sensor device, which comprises a cylindrical structure, wherein a first excitation coil and a second excitation coil are wound on the periphery of the upper part of the cylindrical structure. The detection coils are connected in series via a second signal line and transmit data to an external data analysis terminal. Positioning and quantitative analysis are performed when detecting corrosion of metal piping.

However, limitations remain in these tools in the State of the Art. Therefore, the present patent application aims at implementing a low-cost inspection tool, with high modularity and operational flexibility, reduced complexity, ease of implementation and maintenance, and greater sensitivity for inspection and assessment of pipe walls. along its entire length.

The features and advantages of the present invention will clearly emerge from the detailed description below and with reference to the attached drawings, these being provided only as preferred and non-limiting embodiments.

SUMMARY

The present invention discloses, according to a preferred embodiment thereof, a tool for inspection of the condition of the internal surface of pipes, which comprises at least one PIG structural body, a plurality of eddy current sensors, and a pressure vessel housing a set of electronics in a tight manner inside the same. Furthermore, an inspection method using said inspection tool is disclosed.

BRIEF DESCRIPTION OF THE DRAWINGS

In order to complement the present description and obtain a better understanding of the features of the present invention, figures are presented, where, in an exemplified, non-limiting way, preferred embodiments of this invention are represented.

DETAILED DESCRIPTION

Figure 1:
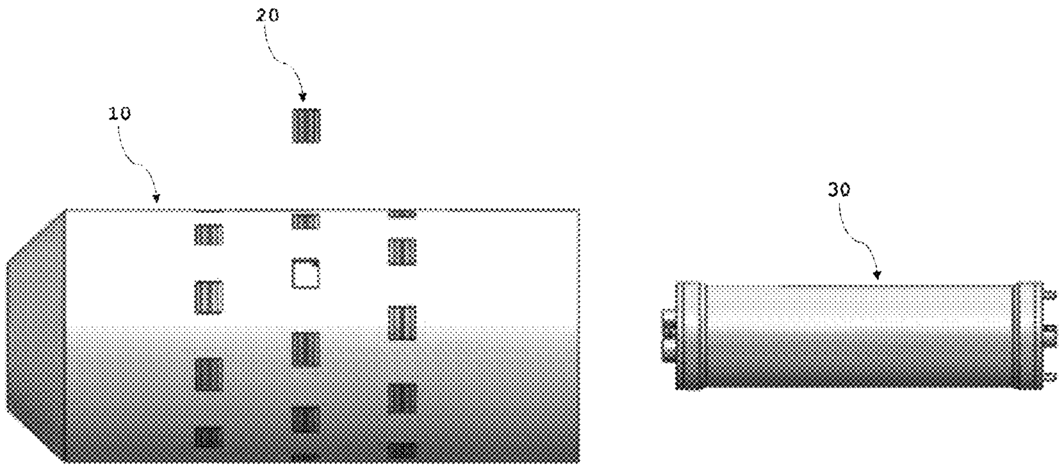
FIG. 1 illustrates an embodiment of a PIG body, a sensor arrangement, and a pressure vessel.

The present invention refers to a tool for inspecting the condition of the internal surface of pipes, with reduced manufacturing costs, ease of operation, and high detection sensitivity.

The tool allows identify anomalies in fuel transport pipes, such as holes and corrosion, by inspecting the entire internal surface of the pipe, allowing the construction of a map with the location of all captured signals.

Another result from inspection with the inspection tool of the present invention is the mapping of all components (such as flanges, unions and valves) present in the line. This is possible since the sensor has a high acquisition rate, which allows a precise and detailed scan of the internal surface of the pipe, enabling the identification, location, and quantification not only of anomalies, but also of components that generate signals of large amplitudes and with their own signatures. This data can be used to check whether the documentation of the piping lines is in accordance with reality.

The inspection system embedded in the tool uses the eddy current technique. This technique has a low manufacturing cost for the sensors, as they are, in a simplified way, a pair of coils, which have the sensitivity to inspect and detect all the defects of interest, as well as the mapping of line components.

The eddy current sensors of the present invention consist of a pair of coils with their geometric axes of winding parallel to the inspected surface, so that the direction of each winding is such that, when passing the same alternating current through the coils, a magnetic field is generated in the same direction in each of them. This fact causes the resulting magnetic field, formed by the sum of the individual field of each coil, to be amplified, resulting in greater sensitivity of the probes. Therefore, the inspection is carried out through a magnetic induction on the surface of the pipe through the alternating magnetic field generated by the sensors. This induction will cause the appearance of an alternating current in the piping, which, in turn, will cause the appearance of a second magnetic field, thus causing self-induction in the probes. Therefore, when passing through a region containing defects (or line components), there is a disturbance in the currents induced in the piping, causing a change in the response generated by the sensor self-induction. This allows a single probe to be used both to generate the inspection signal and to read the response generated by the same.

The number of sensors applied is the minimum necessary to cover the entire internal region of the pipes, ensuring that no region will fail to be assessed. The reduction in the complexity of the tool and sensors guarantees a reduction in manufacturing and operating costs, which allows the inspection to be carried out on a more recurring basis.

Furthermore, due to the simplified development and which does not require the use of magnets to generate magnetic fields, the activities of placing/removing the inspection tool from the piping line can, for example, be carried out manually by an operator.

As illustrated in FIG. 1, the tool for inspection of the condition of the internal surface of pipes comprises, in a preferred configuration of the invention, at least one PIG structural body 10, a plurality of eddy current sensors 20, and a vessel pressure 30.

The PIG structural body 10 is responsible for retaining and transporting the plurality of eddy current sensors 20 and the pressure vessel 30. Preferably, the plurality of eddy current sensors 20 is arranged spaced around the circumference of the PIG structural body 10, in a shape similar to a crown. Preferably, a suitable quantity of crowns of eddy current sensors 20 is used according to the size of the pipe to be inspected.

Figure 7:
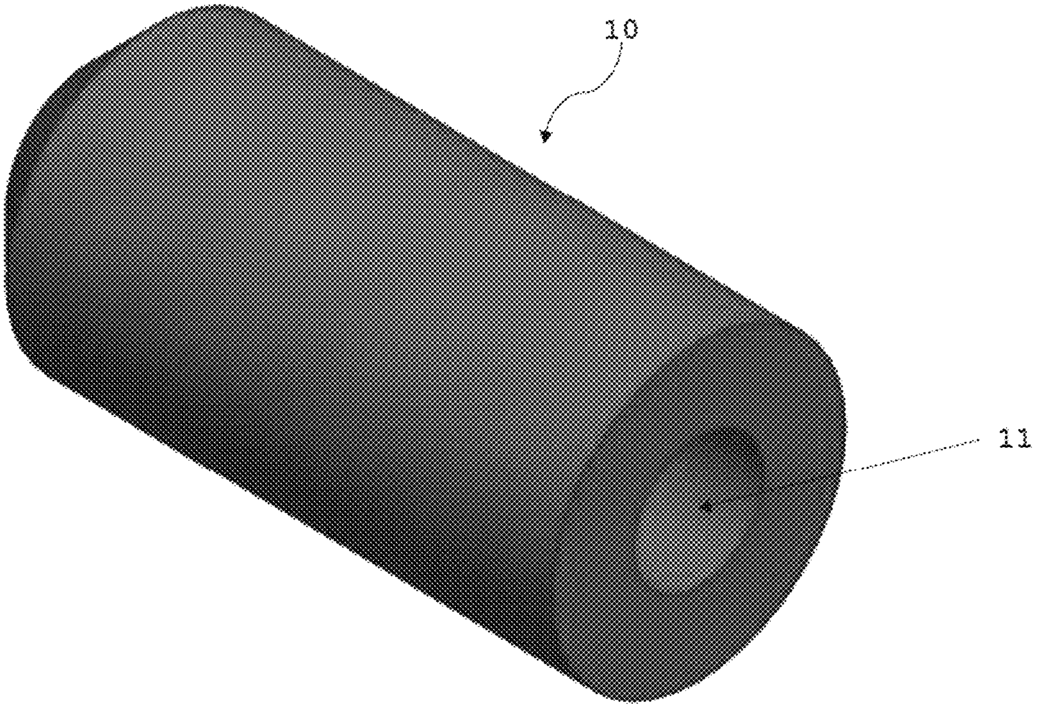
FIG. 7 illustrates the first embodiment of the PIG body with a preferred coating.

It will be appreciated that the geometries and configuration of the plurality of sensors 20 and the pressure vessel 30 (including the set of electronics 40) of the present invention are such that they make it possible to mount them in bodies of a plurality of different types of conventional instrumented PIGs. Preferably, the pressure vessel 30 is mounted in a central housing 11 of the PIG structural body 10, as illustrated in FIG. 7.

Figure 6:
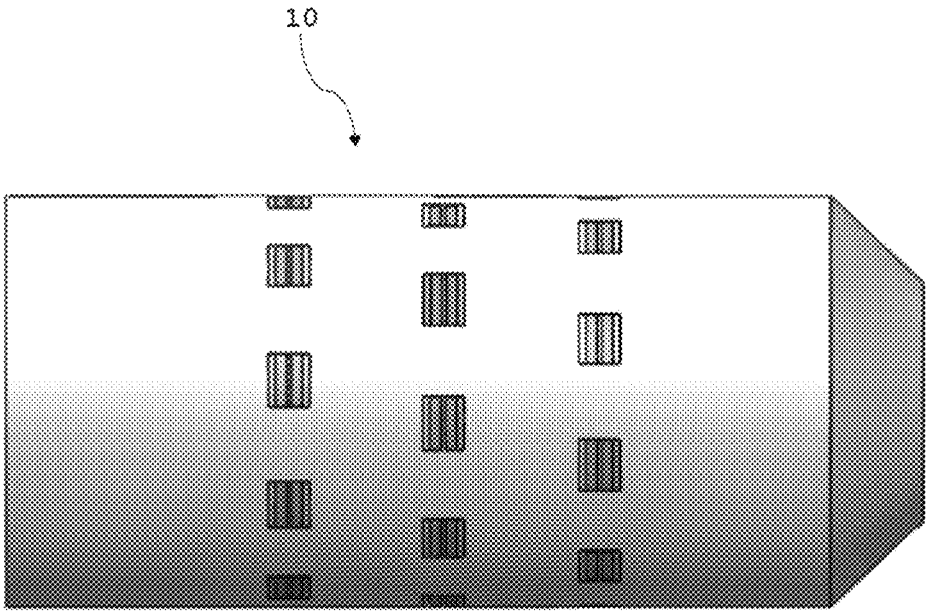
FIG. 6 illustrates a first embodiment of the PIG body of the inspection tool with a foam PIG body.
Figure 8:
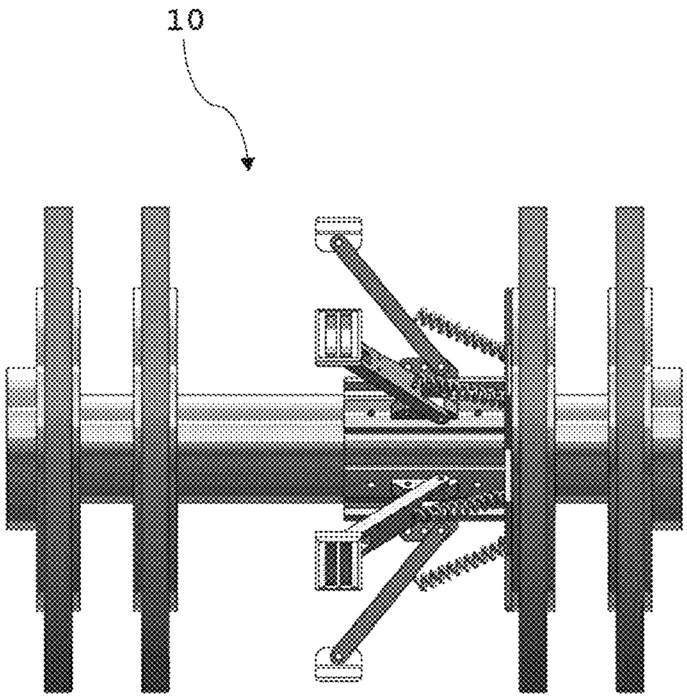
FIG. 8 illustrates a second preferred embodiment of the PIG body of the inspection tool with mandrel PIG body.
Figure 9:
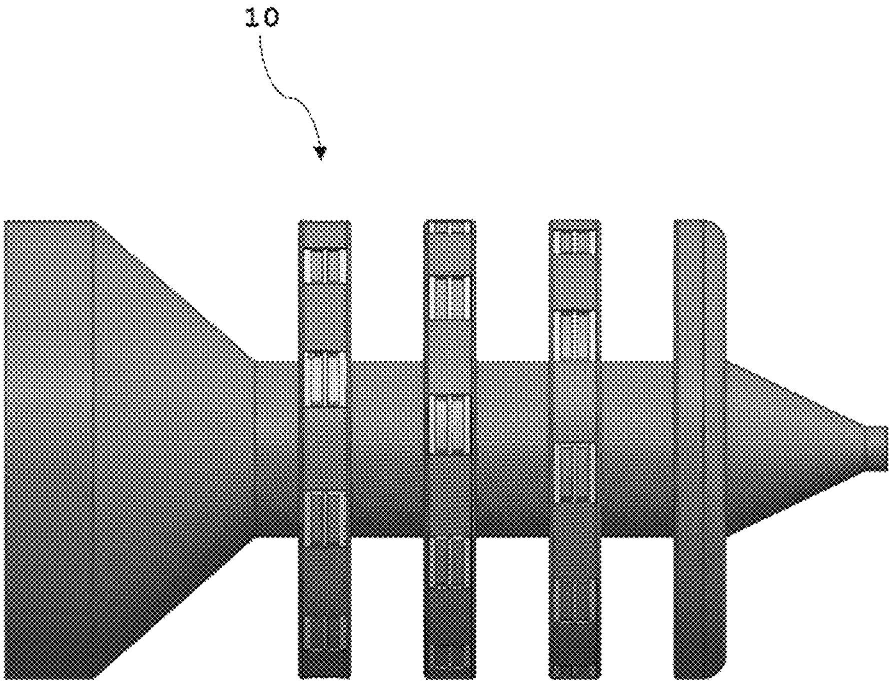
FIG. 9 illustrates a third preferred embodiment of the PIG body of the inspection tool with flex PIG body.

Illustratively, the PIG structural body 10 may be any of a foam PIG as illustrated in FIG. 6, a mandrel PIG as illustrated in FIG. 8, a flex PIG as illustrated in FIG. 9, or other models known to a technician skilled in the technical field of the present invention. Preferably, the PIG structural body 10 comprises an elastomer coating, as also illustrated in FIG. 7. The elastomer coating aims at protecting the sensors (20) from friction generated by contact with the internal surface of the pipe, thus increasing the inspection tool life.

Figure 2:
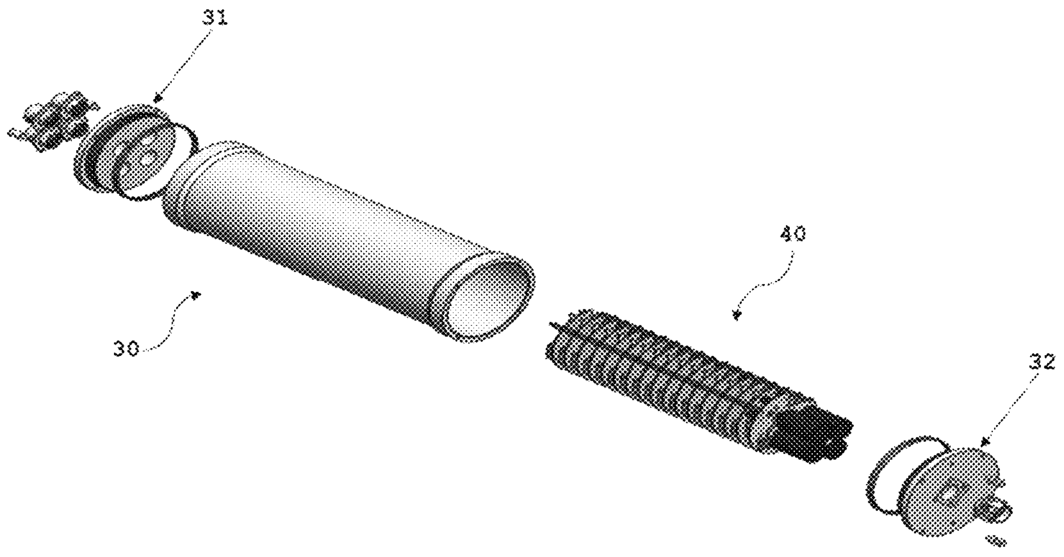
FIG. 2 illustrates an exploded view of an embodiment of a pressure vessel.

As illustrated in FIG. 2, the pressure vessel 30 houses a set of electronics 40 tightly inside the same. The entire set of electronics 40 was designed aiming at its applicability in autonomous inspection tools that work without interrupting the transport of fluids in the piping line. Accordingly, the geometries and configuration of the electronic components of the set of electronics 40 are such that they make it possible to mount them in the pressure vessel 30. Preferably, the pressure vessel 30 comprises a substantially cylindrical shape and the set of electronics 40 comprises a compatible shape/arrangement.

Figure 3:
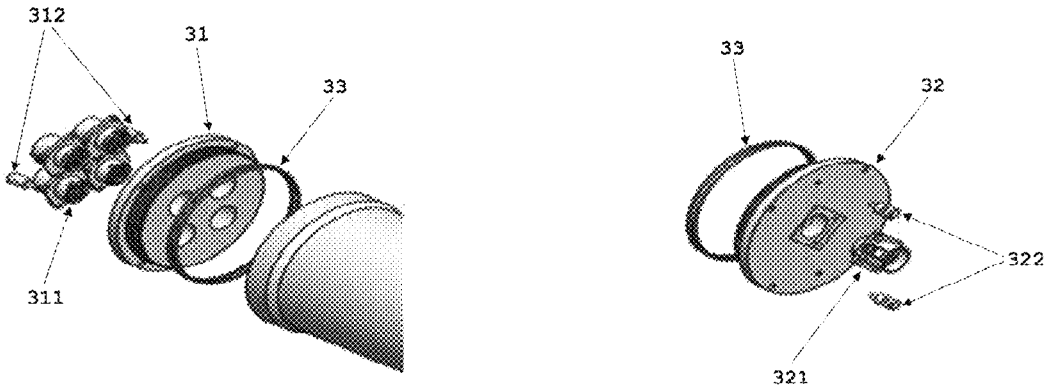
FIG. 3 illustrates enlarged details shown in FIG. 2, focusing on the ends of the pressure vessel embodiment.

Furthermore, as illustrated in greater detail in FIG. 3, the pressure vessel 30 comprises an anterior cover 31 and a posterior cover 32, both configured to receive a sealing element 33. Preferably, the sealing element 33 is an O-ring. As the respective anterior 31 and posterior 32 covers are tightened on the pressure vessel 30, they compress the sealing member 33 to create a tight seal.

As illustrated in FIG. 3, the anterior cover 31 comprises a plurality of connectors 311 preferably having at least four connections. Furthermore, the anterior cover 31 comprises at least two eyelets 312 for anchoring or removing the pressure vessel 30 in the PIG structural body 10 and assisting in opening said cover.

Similarly, as also illustrated in FIG. 3, the posterior cover 32 comprises at least one connector 321, having at least one connection. Furthermore, the posterior cover 32 comprises at least two eyelets 322 for anchoring or removing the pressure vessel 30 from the PIG structural body 10 and assisting in opening said cover.

Figure 4:
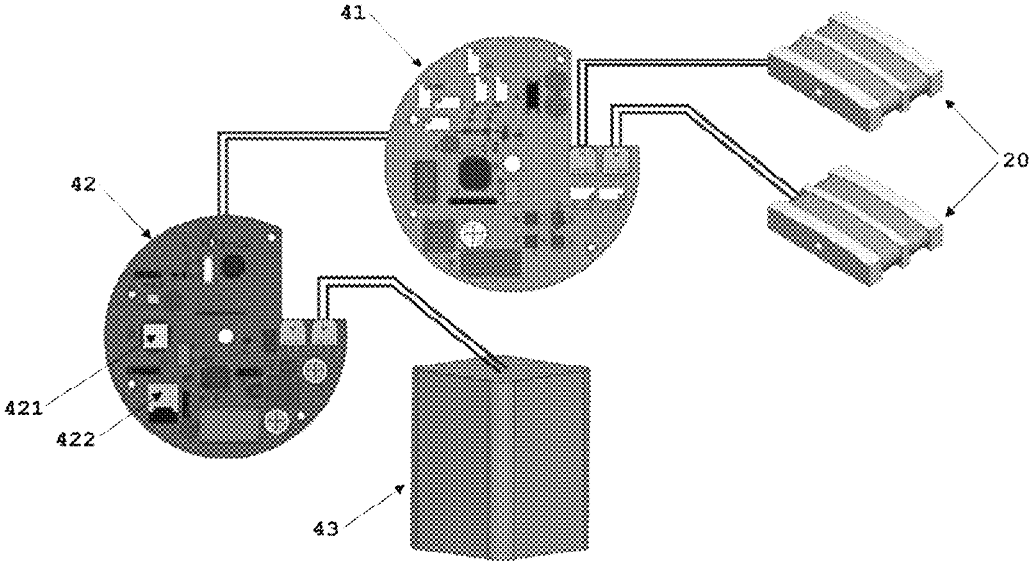
FIG. 4 illustrates a simplified schematic of the connection between some of the tool components.
Figure 5:
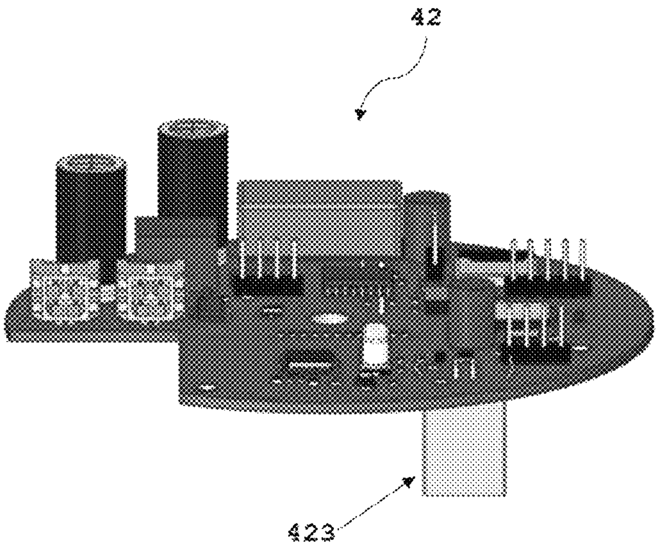
FIG. 5 illustrates an electronic component of the tool in greater detail.

As illustrated in FIGS. 3 and 4, the set of electronics 40 housed in the pressure vessel 30 preferably includes a plurality of DAQ (Data Acquisition) electronic boards 41 connected and responsible for supplying alternating current to the plurality of eddy current sensors 20 and by acquiring the data measured by them, an electronic Data Logger 42 (data recording apparatus) that controls the plurality of DAQ electronic boards 41, organizes all the data acquired by the sensors 20, and records the data generated during the inspection in an internal memory 421 located in the Data Logger 42. Alternatively, the electronic Data Logger 42 transmits the acquired data to a remote computer in real time through a transmitter 423, also located therein, as illustrated in FIG. 5. The electronic Data Logger 42 further comprises at least one angular positioning sensor 422. The set of electronics 40 further includes a battery 43 (or a set of batteries) for powering said electronic components, with the aim of applying the system to an autonomous tool of the PIG type.

It is added that the plurality of DAQ electronic boards 41 is responsible for feeding the sensors with an alternating current, responsible for generating the self-induction effect and, concomitantly, reading through the same sensor the response signals generated by the inspected surface. The electronic Data Logger 42, in turn, is responsible for managing the power supply to each of the DAQs, organizing the readings from each of the sensors, and recording them in an internal memory or exporting them in real time to a computer.

The angular positioning sensor 422 was included in the DAQ electronic boards 41, in order to record the clockwise position of the set of sensors 20. Accordingly, for each reading of the sensor 20, information about its circumferential position is recorded. This is of great importance for the correct identification of defects and discrimination of these (or line components), such as, for example, defects such as through holes in relation to the derivations designed for the fuel transport line.

The connectors 311 of the anterior cover 31 enable a connection of the plurality of sensors 20 with respective DAQ electronic boards 41, wherein at least one connector 321 of the posterior cover 32 enables a connection to the battery and the electronic Data Logger 42, respectively, allowing inspection data to be copied from the electronic Data Logger 42 without the need of opening the pressure vessel 30.

Figure 10:
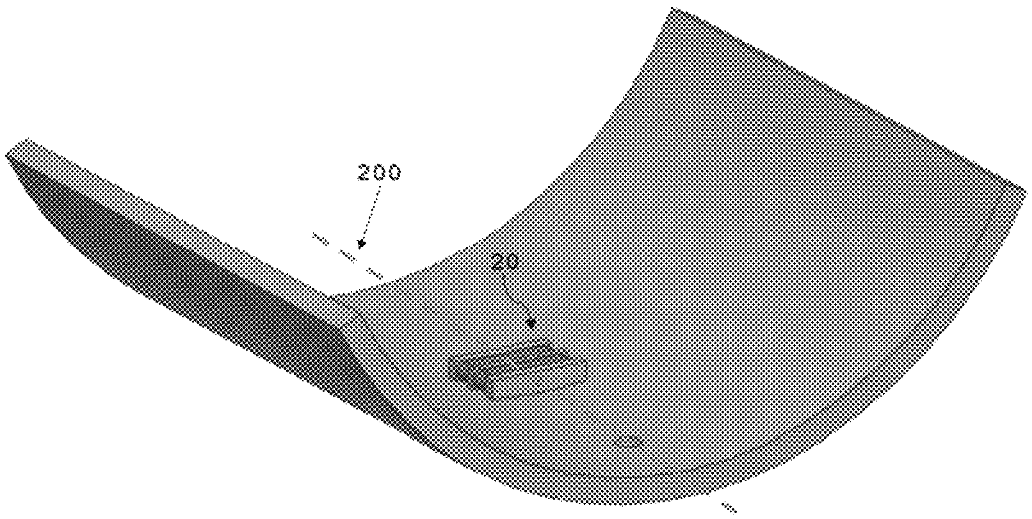
FIG. 10 illustrates a preferred arrangement of the inspection tool sensor on the internal surface of a pipe.
Figure 11:
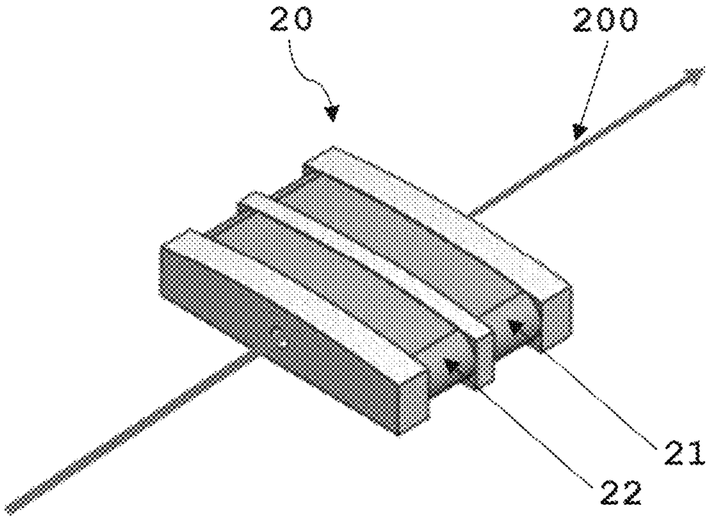
FIG. 11 illustrates a preferred embodiment of the inspection tool sensor.
Figure 13:
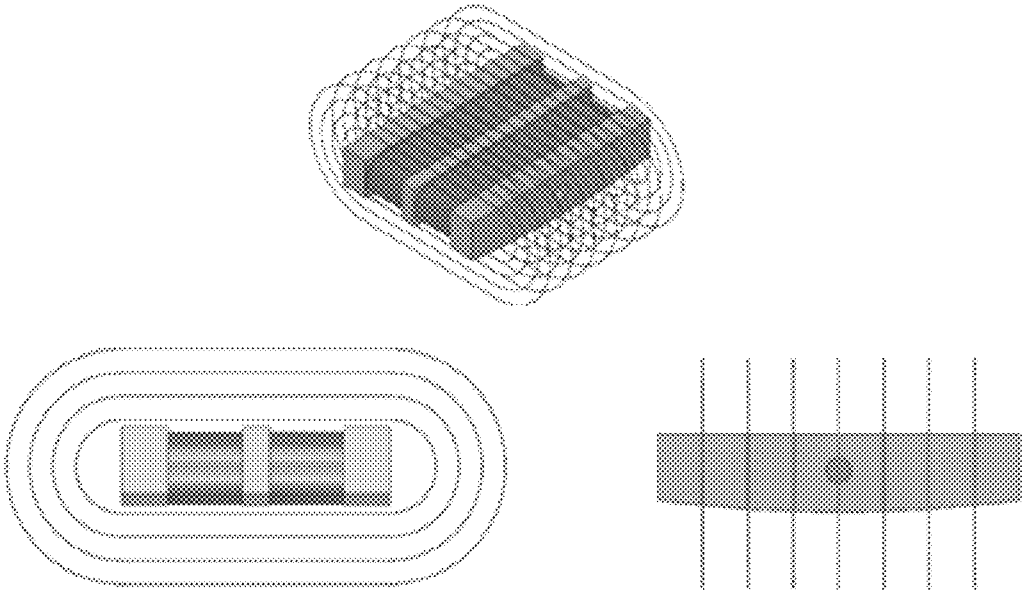
FIG. 13 illustrates as an example the orientation of the primary magnetic field generated by the preferred embodiment of the inspection tool sensor.

As illustrated in FIGS. 10 and 11, the eddy current sensor 20 developed for the inspection tool of the present invention has coils 21, 22 with a geometric axis of winding 200 parallel to the inspection surface. This geometry allows the magnetic field generated for current induction to be approximately constant along the length of the sensor 20, as illustrated in FIG. 13, decreasing its intensity only when it moves beyond the same. Thus, comparing with a sensor with a perpendicular arrangement from the State of the Art, it is possible to observe that the proposed configuration has greater lateral sensitivity; that is, to cover a given region, a smaller number of sensors are used. Such a geometry results in a reduction in system cost by reducing the number of probes to inspect a given region of interest.

An important point to contribute to increasing the sensitivity of sensors 20 is their geometry and the interconnection between the coils. Regarding the geometry of the sensors 20, they were designed to have almost all of their faces straight, ensuring it is easier to fit the same into different types of tools. The only exception is the face in contact with the surface to be inspected. This face, including coils 21, 22, has the same radius of curvature as the internal surface of the pipe to be inspected, which allows a better coupling of the tool (probe) in the inspection region and less loss of the generated magnetic field, increasing the induction effect and, consequently, the sensitivity of the system.

Figure 12:
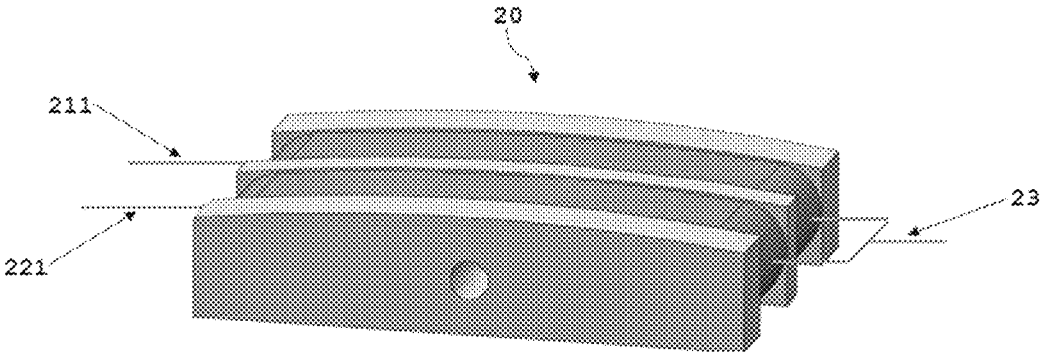
FIG. 12 illustrates details of the preferred embodiment of the inspection tool sensor.

Regarding the interconnection between the coils, as illustrated in FIG. 12, in addition to their normal winding by respective coil wires 211, 221, each coil 21, 22 of the pair is differentially connected 23; that is, each self-induction response reading generated by the pipe will be the difference in self-induction sensed by each coil 21, 22 of the pair separately.

Figure 14:
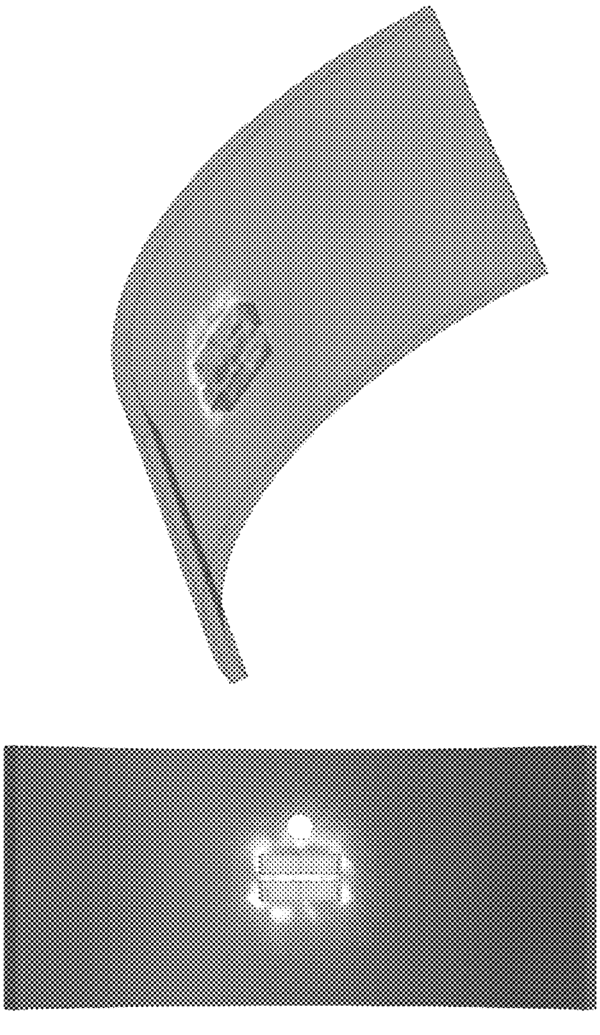
FIG. 14 illustrates results of finite element studies carried out to establish the geometric configuration of the preferred embodiment of the inspection tool sensor.

With a view to establishing the geometric configuration of the sensors, a finite element simulation study was developed to determine the best configuration of winding parameters, as illustrated in FIG. 14. This study, in corroboration with experimental tests, showed that the configuration having 350 turns of an AWG36 wire in a core with dimensions of 38 mm long, 8 mm wide, and coil openings varying from 4.9 mm to 5.9 mm (with the smallest openings at the edges and maximum at the center) has the best sensitivity for detecting holes and corrosion. It will be appreciated that the variation of the coil opening will vary according to the diameter of the surface to be inspected, bearing in mind that the coils 21, 22 are parallel thereto.

Furthermore, it will be appreciated that the number of sensors used to inspect the entire internal surface will be directly linked to the diameter of the pipe, but must respect a radial spacing of 50 mm and an axial spacing of 80 mm, so that there is no influence from the field magnetic generated by one sensor 20 over the other. Thus, for example, for a tool aiming at inspecting a pipe with a nominal diameter of 12" (30.38 cm), three crowns would be needed, with ten sensors 20 each, for a high sensitivity analysis of the defects to be detected. This combination of parameters made it possible to achieve larger dimensions for the sensors, which allows fewer of them to be used for inspection.

Figure 15:
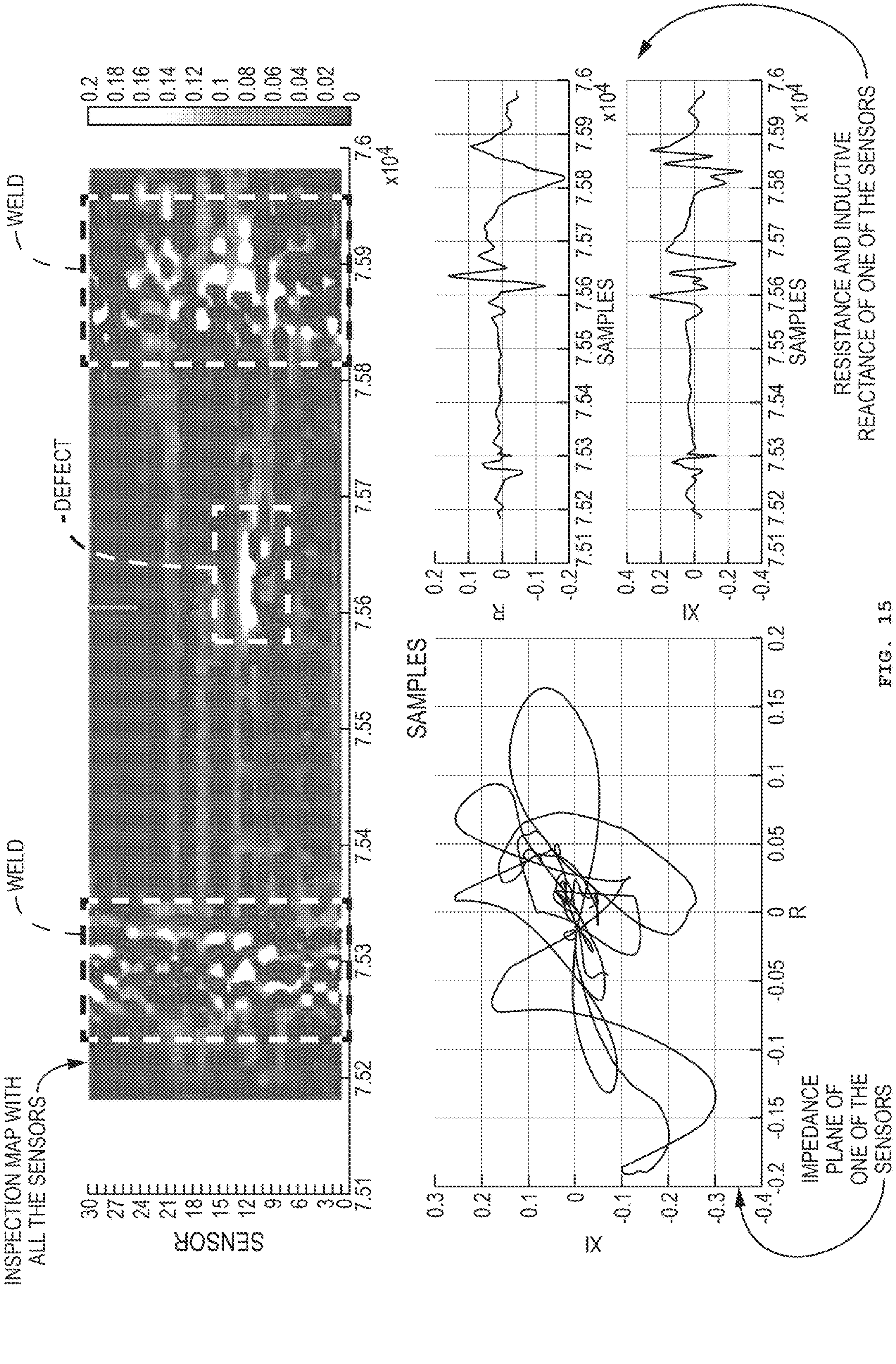
FIG. 15 illustrates an example of generating an inspection map based on the analysis of data obtained from the inspection tool.

By using the inspection tool of the present invention, there are recorded at each instant (a time interval to be defined by the user) and in a single file (which can be a digital file) the information on voltage, current, current phase and angular position of each of the sensors 20. Using these first parameters, it is possible to calculate the values of resistance, inductive reactance, impedance modulus, and impedance phase. Accordingly, it is possible to analyze the inspection in each of these variables for each sensor separately, or all together, generating an inspection map, as illustrated in FIG. 15. In addition, in possession of the resistance and inductive reactance data, it is possible to reconstruct the inspection information into an impedance plane.

Figure 16:
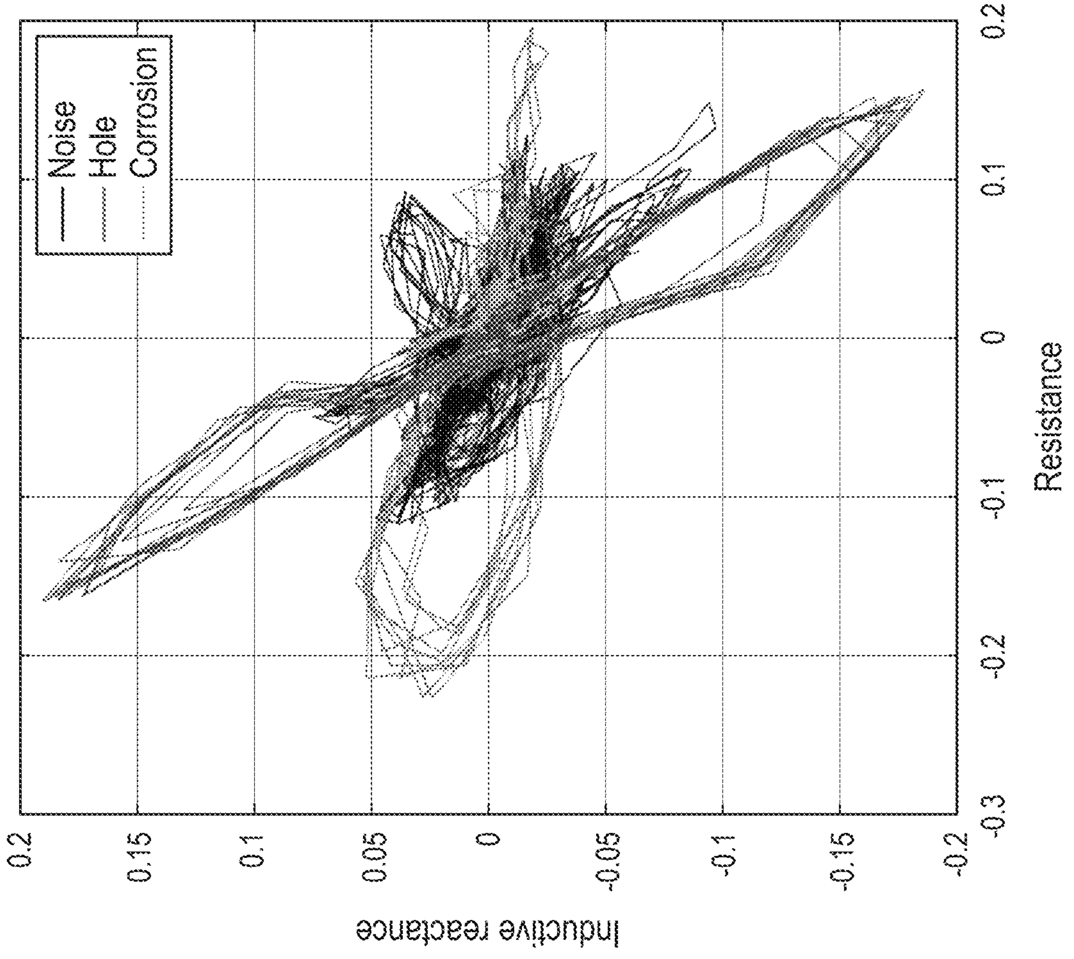
FIG. 16 illustrates an example of a result achieved with the analysis of inspection data of an internal surface of a pipe containing a through hole and corrosion, obtained from the inspection tool.

The joint analysis of variables with the impedance plane allows the identification of patterns that facilitate the distinction of the through hole and corrosion defects from each other, as well as in relation to other components present in the line (valves, flanges and welds). Firstly, comparing the signals of the defects of interest, it was observed that there is a difference in phase and signal morphology between the through hole and the corrosion. The through hole presents a signature in the impedance plane with the phase close to 90° and with a characteristic curve similar to the number 8. In turn, the corrosion has a phase close to 180° and presents a characteristic curve containing only one turn. FIG. 16 illustrates inspection data for a surface containing through holes and corrosion.

Figure 17:
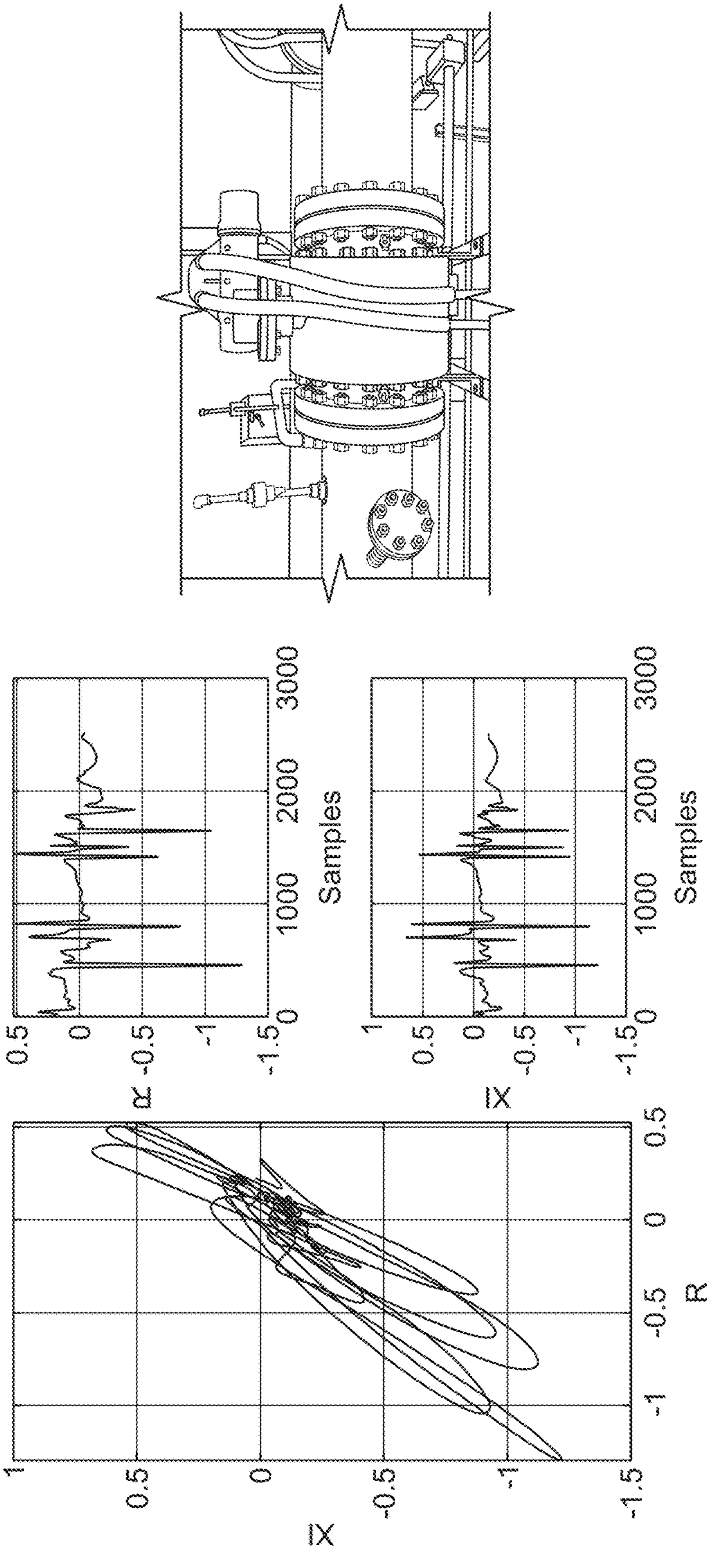
FIG. 17 illustrates an example of identifying a characteristic signal of a valve, achieved with the analysis of inspection data obtained from the inspection tool.
Figure 18:
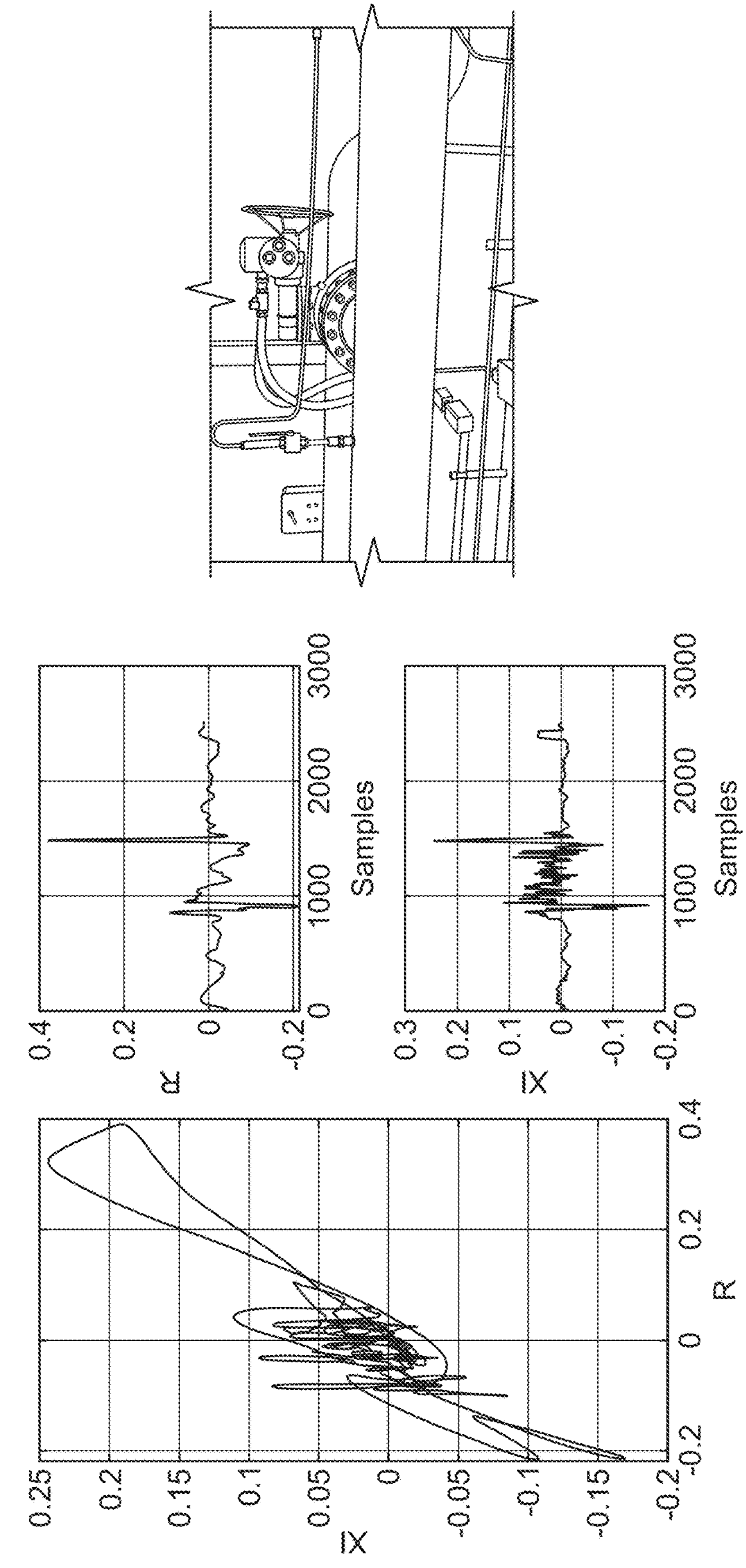
FIG. 18 illustrates an example of identifying a characteristic signal of a T union, achieved with the analysis of inspection data obtained from the inspection tool.
Figure 19:
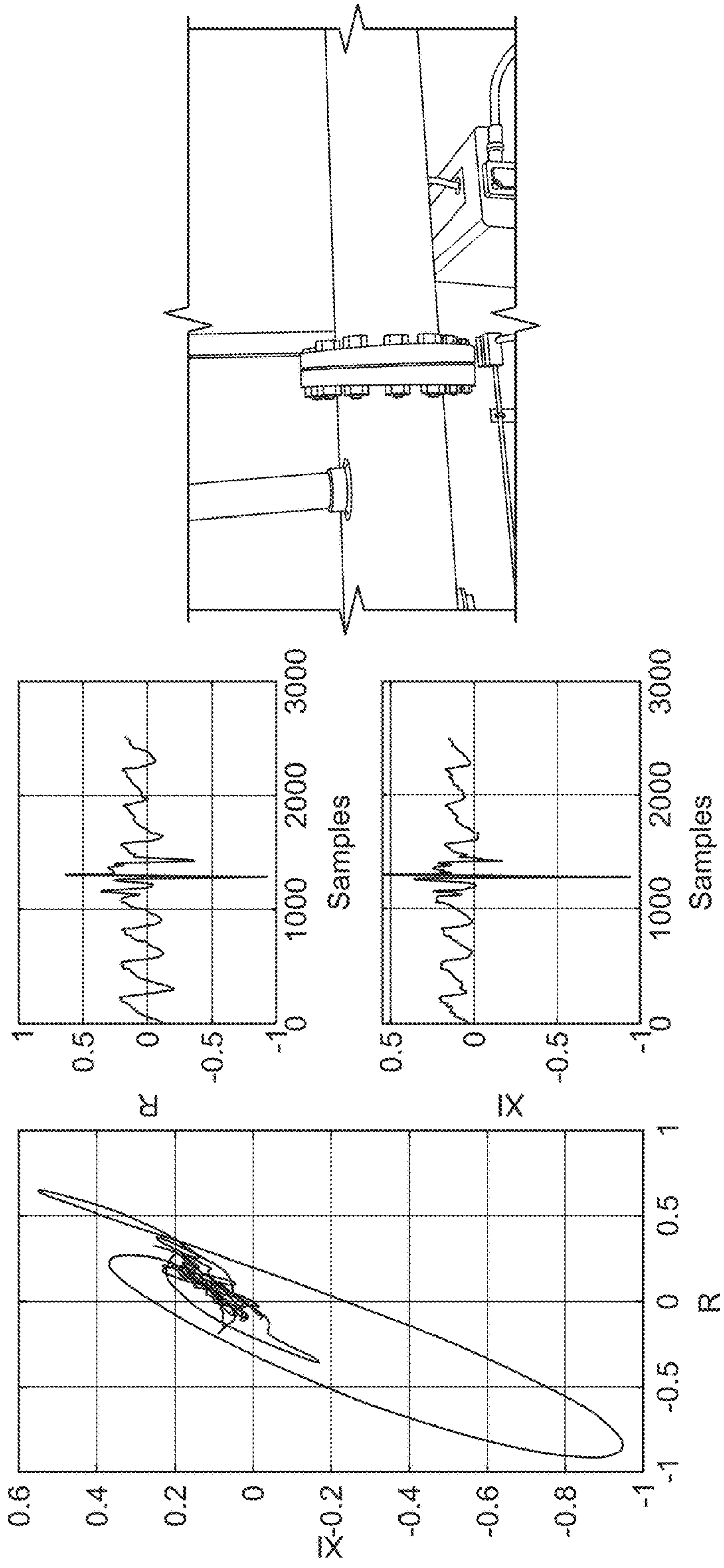
FIG. 19 illustrates an example of identifying a characteristic signal of a flange, achieved with the analysis of inspection data obtained from the inspection tool.

Similarly, it is possible to differentiate the signature of components forming part of the line by assessing the signal of each of them. In valves, as illustrated in FIG. 17, there is a sequence of three signs, a space, and three more signs. These signals refer to the inlet weld, inlet flange, valve inlet, valve outlet, outlet flange, and outlet weld. The unions present a disturbance signal when passing through them, as illustrated in FIG. 18. Finally, as illustrated in FIG. 19, the flanges have three signals relating to inlet/outlet welds and the passage through the flange itself.

It is observed that the ability to distinguish components from each other and from defects guarantees the system the possibility of comparing piping line documentation (which may be out of date), as well as assisting in the positioning of the defects detected along the line.

An important point that is worth to highlight again is that the present invention allows the use of different types of PIGs, providing greater applicability to the tool. The use of a flexible PIG, for example, allows the inspection of pipes at a reduced cost and the possibility of being used to perform multitasks simultaneously, such as detecting through holes, monitoring corrosion, and internal cleaning of the tubes.

According to the above disclosure, a preferred embodiment of an inspection method using an inspection tool according to the present invention is characterized by comprising the steps of:

a PIG structural body (10);

a plurality of eddy current sensors (20) arranged spaced around the circumference of the PIG structural body (10), wherein each of the plurality of sensors (20) comprises a pair of coils (21, 22) having a geometric axis of winding (200) parallel to an inspection direction of the internal surface of the pipe, wherein each coil (21, 22) of the pair is differentially connected (23), and wherein only one face in contact with the internal surface of the pipe of each of the plurality of sensors (20), including the respective coils (21, 22), has the same radius of curvature as that of the internal surface of said pipe; and a pressure vessel (30) mounted in a central housing (11) of the PIG structural body (10), wherein the pressure vessel (30) tightly houses a set of electronics (40), wherein the set of electronics (40) includes at least a plurality of DAQ electronic boards (41) connected, respectively, to each of the plurality of sensors (20), an electronic Data Logger (42) comprising at least one internal memory (421), a transmitter (423), an angular positioning sensor (422), and a battery (43) for powering said electronic components.

Furthermore, according to the disclosure above, a preferred embodiment of the method of inspecting the condition of the internal surface of pipes, according to the present invention, is characterized by comprising:

recording at each instant and in a single file the information on voltage, current, current phase, and angular position of each of the sensors (20);

calculating the values of resistance, inductive reactance, impedance modulus, and impedance phase;

analyzing the inspection in each of the previous variables for each sensor (20), separately or together, to generate an inspection map, in possession of the resistance and inductive reactance data, reconstructing the inspection information into an impedance plane; and performing a joint analysis of the variables with the impedance plane to identify patterns that correspond to defects, as well as patterns that correspond to components present in the line.

Those skilled in the art will value the knowledge presented herein and will be able to reproduce the invention in the presented embodiments and in other variants encompassed by the scope of the attached claims.

What is claimed is:

1. A tool for inspection of the condition of the internal surface of pipes, comprising:

a Pipe Intervention Gadget ("PIG") structural body;

a plurality of eddy current sensors arranged spaced around the circumference of the PIG structural body, wherein each of the plurality of sensors comprises a pair of coils having a geometric axis of winding parallel to an inspection direction, along the direction of travel of the PIG, of the internal surface of the pipe, wherein each coil of the pair is differentially connected, and wherein only one face in contact with the internal surface of the pipe of each of the plurality of sensors, including the respective coils, has the same radius of curvature as that of the internal surface of said pipe; and a substantially cylindrical pressure vessel mounted in a central housing of the PIG structural body, wherein the pressure vessel tightly houses a set of electronics, wherein the set of electronics includes at least a plurality of Data Acquisition ("DAQ") electronic boards connected, respectively, to each of the plurality of sensors, an electronic Data Logger comprising at least one internal memory, a transmitter, an angular positioning sensor, and a battery for powering said electronic components.

2. The tool for inspection of the condition of the internal surface of pipes according to claim 1, wherein the PIG structural body comprises a mandrel PIG.

3. The tool for inspection of the condition of the internal surface of pipes according to claim 1, wherein the structural body is preferably coated with elastomer.

4. The tool for inspection of the condition of the internal surface of pipes according to claim 1, wherein the set of electronics comprises a shape/arrangement compatible with a cylindrical shape of the pressure vessel.

5. The tool for inspection of the condition of the internal surface of pipes according to claim 1, wherein the pressure vessel comprises an anterior cover, comprising a plurality of connectors with at least four connections, and a posterior cover comprising at least one connector with at least one connection.

6. The tool for inspection of the condition of the internal surface of pipes according to claim 5, wherein the respective anterior and posterior covers are configured to receive a sealing element.

7. The tool for inspection of the condition of the internal surface of pipes according to claim 5, wherein the respective anterior and posterior covers comprise, respectively, at least two eyelets.

8. An inspection method using an inspection tool as defined in claim 1, comprising the steps of:

recording at each instant and in a single file the information on voltage, current, current phase, and angular position of each of the sensors;

calculating the values of resistance, inductive reactance, impedance modulus, and impedance phase;

analyzing the inspection in each of the previous variables for each sensor, separately or together, to generate an inspection map;

in possession of the resistance and inductive reactance data, reconstructing the inspection information into an impedance plane; and performing a joint analysis of the variables with the impedance plane to identify patterns that correspond to defects, as well as patterns that correspond to components present in the line.

9. The tool for inspection of the condition of the internal surface of pipes according to claim 1, wherein the PIG structural body comprises a foam PIG.

10. The tool for inspection of the condition of the internal surface of pipes according to claim 1, wherein the PIG structural body comprises a flex PIG.

* * * * *